April 12, 1949.　　　　L. GELBMAN　　　　2,467,203
PALLET CHARGING AND TIERING MACHINE

Filed Nov. 24, 1945　　　　　　　　　　　　5 Sheets-Sheet 1

INVENTOR.
LOUIS GELBMAN
BY
ATTORNEY.

April 12, 1949.　　　　　L. GELBMAN　　　　　2,467,203
PALLET CHARGING AND TIERING MACHINE
Filed Nov. 24, 1945　　　　　　　　　　　　5 Sheets-Sheet 3

INVENTOR.
LOUIS GELBMAN
BY
ATTORNEY

April 12, 1949.     L. GELBMAN     2,467,203
PALLET CHARGING AND TIERING MACHINE
Filed Nov. 24, 1945     5 Sheets-Sheet 5

Fig. 16

INVENTOR.
LOUIS GELBMAN
BY
ATTORNEY.

Patented Apr. 12, 1949

2,467,203

UNITED STATES PATENT OFFICE 2,467,203

PALLET CHARGING AND TIERING MACHINE

Louis Gelbman, Yonkers, N. Y.

Application November 24, 1945, Serial No. 630,641

14 Claims. (Cl. 25—1)

This invention relates to new and useful improvements in a pallet charging and tiering machine, and has particular reference to a machine of this type for supplying and removing pallets to and from a brick or block making machine.

The pallet charging and tiering machine is intended to receive pallets in tiers of ten, or more, or less, and to supply these pallets individually to a block or brick machine and then to place the pallets with the blocks or bricks made by the brick machine, into tiers of the same number as supplied. It is proposed that each of the pallets be substantially of channel shape so as to have a top wall and side support arms. They are tiered by resting them on their support arms, one above the other. The bricks or blocks are disposed on the top walls of the pallets and when the pallets are in the tiered positions, the bricks or blocks will be contained in the spaces between said top walls.

The new pallet charging and tiering machine shall include a pallet receiving member which is vertically movably mounted on the frame of the machine and which is adapted to be periodically vertically reciprocated by the brick or block machine during its operation. A pallet lifting fork and a pallet lowering fork shall be associated with the frame of the machine and with the pallet receiving member, in such a fashion that the pallet lifting fork periodically rises a distance equal to the height of one pallet, and the pallet lowering fork descends the same amount, so that it is possible to feed the tier of pallets to the pallet receiving member, and to receive the pallets upon the lowering fork in a way that they become restacked into the tier condition.

The invention contemplates a charging carriage for moving the top pallet from the tier of pallets on the lifting fork to a position on the pallet receiving member and for moving a pallet from said pallet receiving member to a position on said lowering fork or upon pallets already stacked on the lowering fork. The carriage shall be associated with means by which it is moved to a charging position when the pallet receiving member reaches the pallet receiving position and then back to its starting position.

The pallet lifting fork shall be associated with means for raising it in steps, and the pallet lowering fork shall be asociated with means for lowering it in steps, of distances equal to one pallet height, each time said charging carriage performs one cycle of its movements.

A pallet delivery conveyor shall be provided for carrying away a tier of pallets from the pallet lowering fork. Means shall be associated with said delivery conveyor for operating it each time said lowering fork supplies it with a tier of pallets for moving them from said lowering fork.

There shall also be a pallet supply conveyor for supplying a tier of pallets to the lifting fork. This supply conveyor shall be associated with means for operating it each time said lifting fork reaches its lowered position for supplying it with a new tier of pallets.

It is proposed to provide means for returning said lowering fork to a raised position and returning said lifting fork to a lowered position each time that a tier of pallets is removed from the lowering fork.

Still further the invention proposes the construction of a pallet charging and tiering machine embodying the features briefly explained which is simple in construction, simple and reliable in operation and which may be manufactured and sold at a relatively low cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure.

Figures 2, 7, 8:
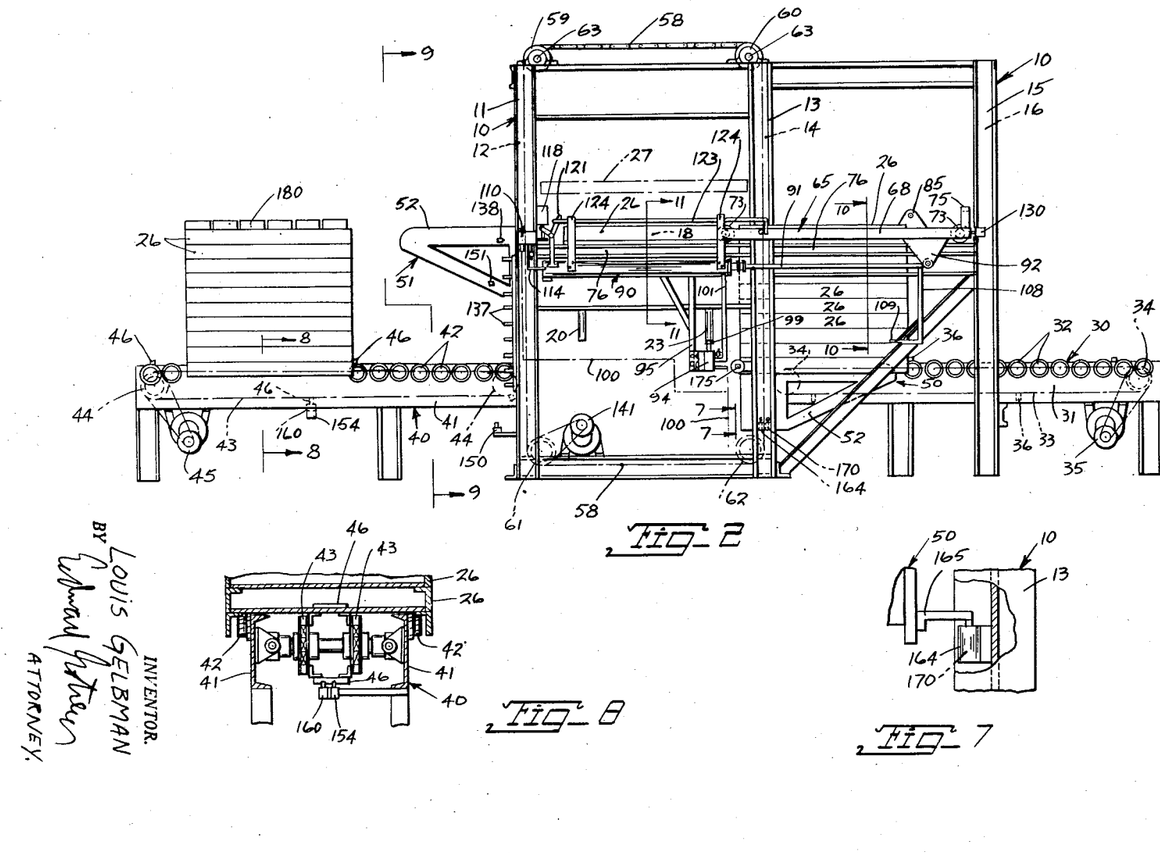
Fig. 2 is an elevational view of Fig. 1 but illustrated with all parts in place.
Fig. 7 is an enlarged elevational view looking in the direction on the line 7—7 of Fig. 2, a portion thereof being broken away to better disclose certain parts in the back.
Fig. 8 is a fragmentary vertical sectional view taken on the line 8—8 of Fig. 2.
Figure 9:
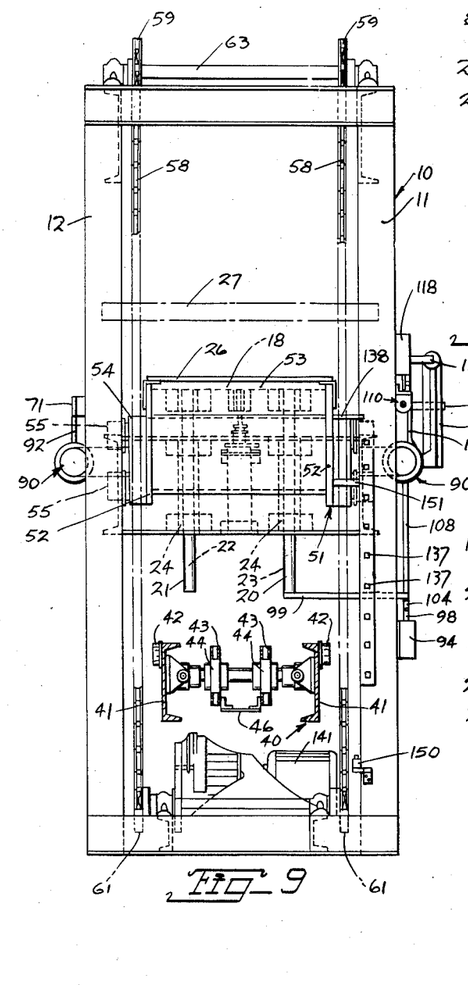
Fig. 9 is an enlarged vertical sectional view taken on the line 9—9 of Fig. 2.
Figure 10:
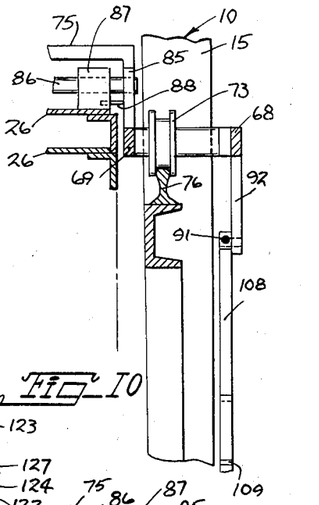
Fig. 10 is a fragmentary enlarged vertical sectional view taken on the line 10—10 of Fig. 2.
Figure 11:
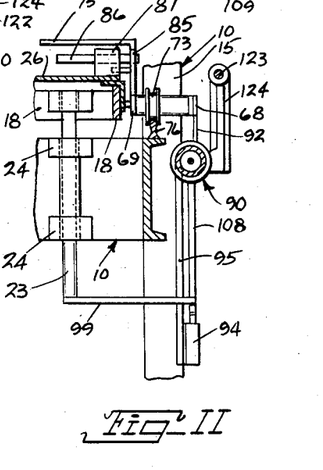
Fig. 11 is a fragmentary enlarged vertical sectional view taken on the line 11—11 of Fig. 2.

The pallet charging and tiering machine, in accordance with this invention, includes a structural frame 10. This frame 10 includes six vertical I-beams 11, 12, 13, 14, 15 and 16. A pallet receiving member 18 is vertically movably mounted on a portion of the frame 10 and is adapted to be periodically vertically reciprocated by a block or brick machine not illustrated on the drawings, nor described in the specification. However, a block or brick machine of this type is shown in my patent application for a Brick or block machine, Serial No. 603,462, filed on July 6, 1945, Patent No. 2,431,034. The pallet receiving member 18 is supported upon four vertical posts 20, 21, 22 and 23 which are vertically slidably guided by standards 24 mounted upon certain of the beams of the frame 10, see Fig. 11. The pallet receiving member 18 is illustrated supporting a pallet 26. The dot and dash lines 27 above the pallet 26, as illustrated in Figs. 2 and 9 represents a mold of a brick or block machine against the bottom of which the pallet 26 will be engaged when the pallet receiving member 18 assumes its raised position. The pallet receiving member 18 is illustrated on the drawings in its lowered position.

A pallet supply conveyor 30 is adapted to supply a tier of pallets 26 to one side of the pallet receiving member 18. The conveyor 30 includes a pair of longitudinal beams 31 upon the sides of which there are rollers 32 upon which the bottommost pallet 26 of the tier of pallets 26 rest. The conveyor 30 also includes an endless member 33, such as sprocket chains, which are guided over wheels 34, and which is driven by an electric motor 35. The endless member 33 at spaced points is provided with abutment strips 36 which are adapted to engage against the bottommost pallet 26 of the tier of pallets 26 for moving the tier of pallets 26 forwards.

A pallet delivery conveyor 40 is located on the other side of the pallet receiving member 18 and is adapted to carry away said tiers of pallets 26. This delivery conveyor 40 is substantially identical to said supply conveyor 30. It includes longitudinal beams 41 upon the sides of which there are rollers 42 upon which the tiers of pallet 26 are adapted to rest. There is an endless member 43, such as sprocket chains, which engages around wheels 44 and which is driven by an electric motor 45. The endless member 43, at spaced points, is provided with abutment strips 46 which are adapted to engage the bottommost pallet 26 of the tiers of pallets 26 for moving them forwards.

The pallet lifting fork 50 is associated with the pallet supply conveyor 30 for receiving a tier of pallets 26 from said supply conveyor 30 and for supplying these pallets 26 to the pallet receiving member 18. The delivery conveyor 40 is associated with a pallet lowering fork 51 for receiving the pallets 26 from the pallet receiving member 18, in tier formation, and for supplying the tier of pallets 26 to the delivery conveyor 40. The forks 50 and 51 are of identical construction except they extend in different directions. Each of these forks includes a pair of spaced side arms 52 which are adapted to engage beneath the bottommost pallet 26 in between the side arms of said pallet. The side arms 52 of said forks are connected together at their inner ends by a transverse member 53. Blocks 54 are mounted upon the side arms 52, and said blocks 54 are provided with vertically spaced pairs of rollers 55 which engage in between the flanges of the vertical I-beams 11, 12, 13 and 14. These rollers 55 serve to vertically guide the forks 50 and 51.

Movable endless members 58, such as chains, are connected with the forks 50 and 51, so that said forks will move in opposite directions when the endless members 58 are moved. More particularly each endless member 58 is guided over four wheels 59, 60, 61 and 62 on shafts 63 mounted on the frame 10. These wheels are so arranged that the endless members 58 have vertical opposite side portions. The forks 50 and 51 are connected with these opposite side portions and for this reason said forks will move in opposite directions. When the fork 50 is moved up the fork 51 will move downwards, and vice versa.

A charging carriage 65 is associated with the frame 10 and is for the purpose of moving the top pallet 26 from the tier of pallets 26 on the lifting fork 50 to a position on the member 18 and for moving the pallet 26 which is on the member 18 to a position on the lowering fork 51 or upon pallets 26 already supported on said lowering fork 51. The charging carriage 65 includes a number of longitudinal bars 68, 69, 70 and 71. The bars 68 and 69 are connected together at their front and back ends with connecting rods 72, see Fig. 6. Rollers 73 are mounted on each of said connecting rods 72. Similarly the front and back ends of the bars 70 and 71 are connected together with similar connecting rods which are also provided with rollers 73.

The rear ends of the bars 69 and 70 are connected together by a reinforcement bridge 75. The rollers 73 ride upon tracks 76 which are mounted upon beams of the frame 10. The charging carriage 65 is capable of moving horizontally from the position at the right as illustrated in Fig. 2 to the left, and then back again to the right. During this motion the charging carriage will move the uppermost pallet 26 from the tier of pallets 26 onto the pallet receiving member 18, and will move the pallet 26 which is now supported on said member 18 onto the lowering fork 51. In order to accomplish this operation, the charging carriage 65 is provided with a pair of front depressible bolts 80. Said bolts 80 are slidably mounted in the front connecting rods 72. They are urged outwards by springs 81. The bolts 80 have bevel back sides 82 and straight front sides 83. The straight sides 83 engage the back end of the pallet 26 which is on the pallet receiving member 18 so that when the charging carriage 65 moves forwards it will move said pallet 26 correspondingly, and move it onto the lowering fork 51.

The charging carriage 65 is provided with a pair of upwardly directed lugs 85 between which there is mounted a bar 86. A pair of pawls 87 are mounted on the bar 86 and are held from swinging backwards by pins 88 mounted on and projecting from the lugs 85. The pawls 87 normally engage the back of the uppermost pallet 26 of the tier of pallets 26 on the lifting fork 50 for moving said top pallet 26 forwards and onto the pallet receiving member 18. When the carriage 65 moves from its charging position back to its starting position, the bolts 80 will be forced inwards because of the bevels 82 and will idle past the new pallet 26 which was just deposited upon the pallet receiving member 18.

Figures 1, 3, 4, 5, 6:
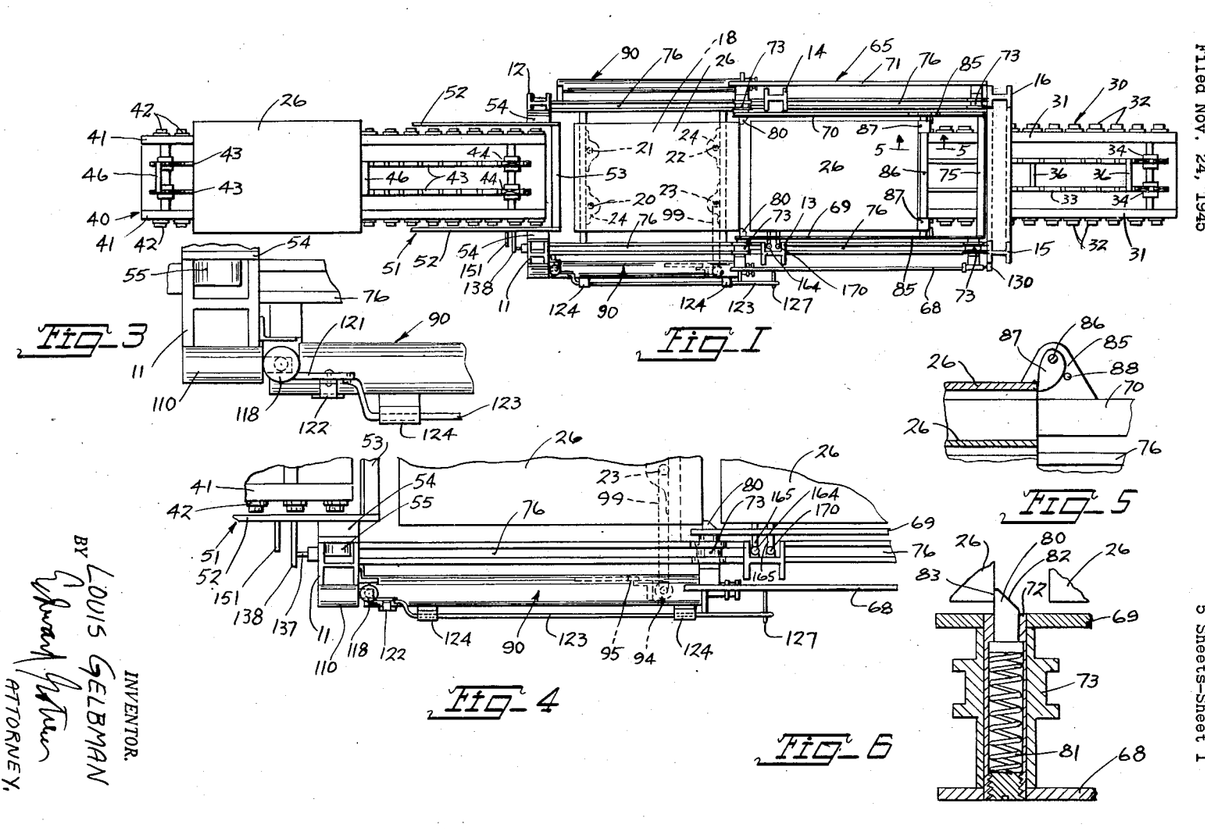
Fig. 1 is a plan view, with certain parts removed for clarity of illustration, of a pallet charging and tiering machine constructed in accordance with this invention, and illustrated with tiers of pallets as they would appear during one moment of operation of the machine.
Fig. 3 is a fragmentary enlarged detailed view of a portion of Fig. 1.
Fig. 4 is an enlarged fragmentary enlarged detailed view of another portion of Fig. 1.
Fig. 5 is a fragmentary vertical sectional view taken on the line 5—5 of Fig. 1.
Fig. 6 is a horizontal enlarged sectional view through the large roller illustrated in Fig. 4.

The charging carriage 65 is associated with means for moving it to a charging position when said pallet receiving member 18 reaches a pallet receiving position, its down position, and then back to its starting position. This means is characterized by a pair of air cylinders 90 with pistons, which are fixedly mounted on the frame 10 and which have extending piston rods 91 which are connected with lugs 92 on the charging carriage 65. The lugs 92 are directed downwards from the side bars 68 and 71 of the charging carriage 65. In Figs. 1 and 2 the piston rods 91 are illustrated in their extended positions, and consequently the charging carriage 65 is in its starting position. In this latter position, the pawls 87 are engaging against the back edge of the uppermost pallet 26 on the tier of pallets 26 on the lifting fork 50. The piston rods 91 are retracted by air pressure controlled by an air valve 94. This air valve 94 is supported on a bracket 95 which is mounted upon the bottom of one of the cylinders 90.

The air valve 94 has a valve head 96 which is normally urged upwards by an expansion spring 97. The valve head 96 has a projecting stem 98 which is normally held in a depressed condition by a rod 99 which is mounted on and projects from the post 23 of the pallet receiving member 18. In a depressed condition, the valve head 96 connects an air supply line 100 with air lines 101 which connect with the back ends of the cylinders 90. With the parts in this condition, compressed air will be supplied to the back ends of the cylinders 90 for forcing the pistons forwards and correspondingly moving the piston rods 91 for moving the charging carriage 65 to the charging position. When the valve stem 98 is released, the spring 97 will move the valve head 96 upwards so as to connect the air pipe lines 101 with a valve controlled discharge 103, or bleed to the atmosphere. The valve stem 98 has a top section 104 which is hingedly mounted by a hinge 105. A spring 106 is coaxially mounted on the hinge 105 and normally tends to urge the top section 104 into a vertical position aligned with the bottom section of the valve stem 98.

Figures 12, 13, 14, 15:
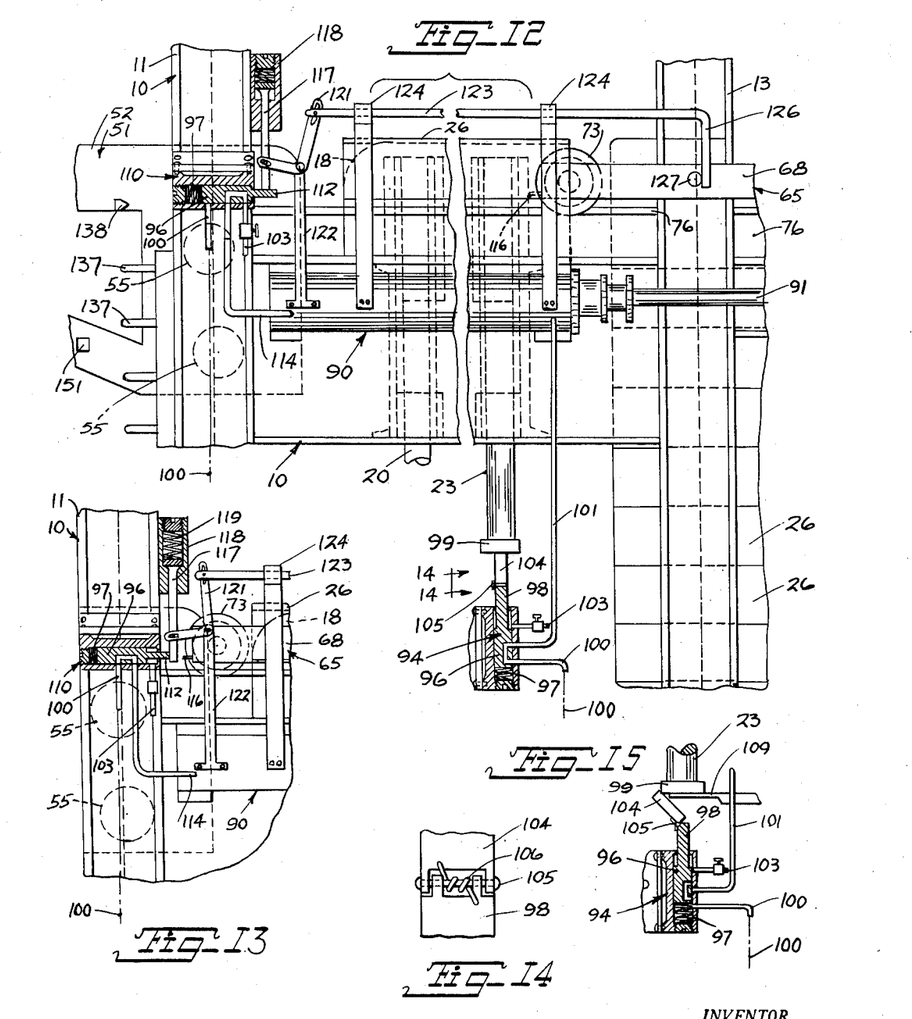
Fig. 12 is a fragmentary enlarged detailed view of a portion of Fig. 2, with certain parts broken away to disclose interior parts.
Fig. 13 is a fragmentary view of a portion of Fig. 12 but illustrated with certain of the parts in different positions.
Fig. 14 is a fragmentary enlarged elevational view looking in the direction of the line 14—14 of Fig. 12.
Fig. 15 is a fragmentary view of a portion of Fig. 12 but illustrated with certain of the parts in different positions.
Figure 16:
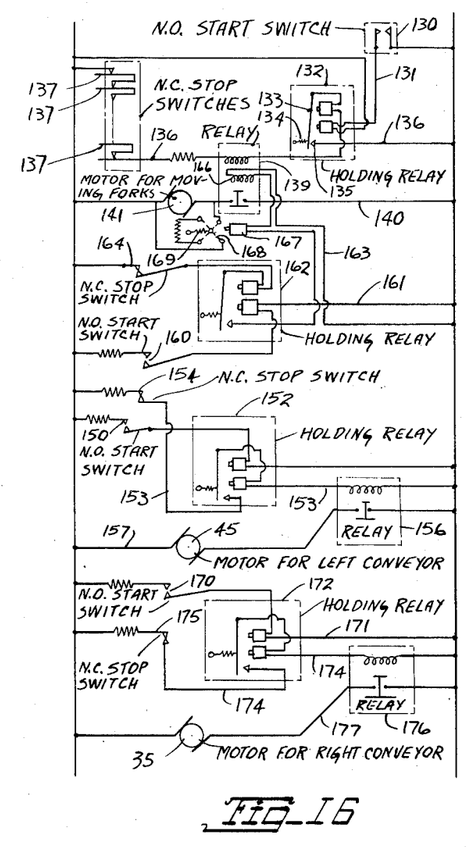
Fig. 16 is a schematic wiring diagram of the device.

An arm 108 is mounted upon one of the piston rods 91 and is provided with a forwardly extending bottom end 109 which will engage against the top section 104 of the valve stem 98, when the charging carriage 65 reaches its charging position. In Fig. 15 the end 109 of the arm 108 is shown in the process of bending said section 104 of the valve stem 98, and the valve head 96 is shown in an intermediate position. The valve spring 97 will continue to extend the valve head 96 until it reaches its top position in which the air pipe lines 101 will be connected with the air discharge 103. The back ends of the cylinders 90 are now opened to atmosphere and the pistons therein are ready to move back to their initial positions.

Another air valve 110 is mounted upon the vertical I-beam 11. This valve 110 has a horizontal valve head 96 provided with a horizontal stem 112. A spring 97 normally urges the valve head 96 outwards. In this position, shown in Fig. 12, the valve head 96 connects pipe lines 114 which are connected with the front ends of the cylinders 90, with the air discharge 103. When the valve head 96 is depressed, the pipe lines 114 will be connected with the compressed air supply line 100. The charging carriage 65 is provided with a projecting finger 116 which is aligned with the valve stem 112 and which depresses said valve stem when the charging carriage 65 reaches its charging position. A bolt 117 is adapted to lock the valve stem 112 in its depressed position. This bolt 117 is slidably mounted in a body 118 which is mounted on the I-beam 11. A spring 119 normally urges the bolt 117 downwards against the top face of the valve stem 112 when the valve stem 112 is in its extended position, and engages against the end of the valve stem 112 when it is in its depressed position for holding it depressed. In Fig. 13 the charging carriage 65 is shown an instant after it reached its charging position. It is illustrated with the finger 116 disengaged from the valve stem 112. The bolt 117 initially rested on the top face of the finger 116 of the charging carriage 65 and against the top portion of the end of the valve stem 112. When the finger 116 moved away, the spring 119 forced the bolt 117 down to the position in which it is shown in Fig. 13.

A bell crank 121 is pivotally mounted intermediate of its arms on a bracket 122 which is mounted on one of the cylinders 90. The horizontal arm of the bell crank 121 connects with the bolt 117. The vertical arm connects with a rod 123 which is slidably mounted in brackets 124 which are mounted on the cylinder 90. The rod 123 has its free end 126 bent downwards. The charging carriage 65 is provided with a pin 127 which engages the downturned end 126 of the rod 123 for moving the rod 123 to the right, when the charging carriage 65 reaches its starting position. This motion of the rod 123 pivots the bell crank 121 which in turn lifts the bolt 117 freeing the valve stem 112 which is then extended by the spring 97.

It should be recognized that when the pallet receiving member 18 reaches its bottom position, the rod 99 will depress the valve stem 98 so that the valve 94 supplies compressed air to the back ends of the cylinders 90 indirectly causing the charging carriage 65 to be moved forwards to its charging position. During this time the valve 110 is in a position in which the air lines 114 are connected with the air discharge 103. When the charging carriage 65 reaches its charging position the finger 116 will depress the valve stem 112 and cause the valve 110 to supply compressed air to the air lines 114 for moving the charging carriage 65 back to its starting position. When the carriage 65 reaches its starting position the pin 127 will indirectly trip the bolt 117 freeing the valve stem 112 so that the valve 110 assumes a position in which the air lines 114 are again connected with the air discharge 103.

The pallet lifting fork 50 and the pallet lowering fork 51 are associated with means by which the lowering fork 51 is lowered and the lifting fork is raised one pallet height each time that the charging carriage 65 performs one cycle of its movement. This means includes a start switch 130 which is mounted on the frame 10 at a position to be momentarily closed when the charging carriage 65 reaches its starting position. The start switch 130 is connected in a circuit 131 controlling a holding relay 132. This relay has a contact arm 133 which is normally held open by a spring 134. When the circuit 131 is supplied with current the contact arm 133 closes against a contact 135 closing a circuit 136. This circuit 136 remains closed because of the action of the holding relay 132. The circuit 136 includes in series a plurality of normally closed stop switches 137. There is one switch 137 for each pallet of the tier of pallets 26. These switches 137 are mounted upon the frame 10. A projection 138 from the lowering fork 52 is adapted to engage each of the switches 137 for momentarily opening them. The circuit 136 controls a relay 139 which controls a circuit 140 including a motor 141 for moving the forks 50 and 51. This motor 141 is connected to drive the endless member 58.

It should be noted that each time the charging carriage 65 reaches its starting position, the switch 130 will be momentarily closed energizing the holding relay 132 which closes the circuit 136. This circuit operates the relay 139 which in turn controls the electric motor 141. The motor 141 now operates for driving the endless member 58 so that the lowering fork 51 is moving downwards and the lifting fork 50 is moving upwards. When these forks move a distance equal to the height of one of the pallets 26, the projection 138 will strike one of the stop switches 137 momentarily breaking the circuit 136 which is then maintained broken by the contact arm 133 moving off of the contact 135. The motor 141 now stops functioning.

The delivery conveyor 40 is associated with means for operating it each time that the lowering fork 51 supplies the delivery conveyor 40 with a tier of pallets 26 for removing the tier of pallets from the lowering fork. This means includes a normally opened start switch 150 which is mounted on the frame 10 and which is momentarily closed by the projection 151 on the lowering fork 51. The start switch 150 is connected with a holding relay 152 which controls a circuit 153. This circuit 153 includes a normally closed stop switch 154 which is mounted on one of the longitudinal beams 41 of the conveyor 40. The holding relay 152 is identical in construction to the holding relay 132. The circuit 153 controls a relay 156 which controls a circuit 157 controlling said motor 45. The motor 45 is connected to operate the pallet delivery conveyor 40. The normally closed stop switch 154 is operated by the abutment strips 46 of said conveyor 40. Each time an abutment strip 46 engages the switch 154 the switch is momentarily opened which indirectly stops the motor 45.

The lowering fork 51 is also associated with means for returning it to a raised position and indirectly causing the lifting fork 50 to return to its lowered position each time a tier of pallets 26 are moved from said lowering fork 51. This means includes a normally opened start switch 160 which is mounted adjacent the switch 154, and which is momentarily closed by each of the abutment strips 46. The start switch 160 is connected in a circuit 161 which controls a holding relay 162. This holding relay 162 controls a circuit 163 which includes, in series, a normally closed stop switch 164. The stop switch 164 is mounted on the I-beam 13. It is operated by an arm 165 mounted on and projecting from the lifting fork 50. The circuit 163 includes, in series, a coil 166 contained in the relay 139 which functions to close the circuit 140 controlling the motor 141. The circuit 163 also includes an electro magnet 167 which controls a reversing switch 168 controlling the motor 141. A spring 169 normally holds said reversing switch 168 in one direction. When the electromagnet 167 is energized the reversing switch 168 is moved in the other direction reversing the motor 141. When the motor 141 is reversed, it will drive the endless member 58 in a reversed direction, causing the lowering fork 51 to be raised and the lifting fork 50 to be lowered. When the lifting fork 50 is in its lowered position the arm 165 operates the stop switch 164 to open the circuit 163.

The supply conveyor 30 is associated with means by which it is operated each time the lifting fork 50 reaches its lowered position for supplying it with a new tier of pallet 26. This means includes a normally opened start switch 170 which is mounted adjacent the switch 164 and which is operated by a finger 165, mounted on the lifting fork 50. The switch 170 is included in a circuit 171 which controls a holding relay 172. This relay 172 is identical in construction with the relay 132. The relay 172 controls a circuit 174 which includes a normally closed stop switch 175 mounted on said I-beam 13 and adapted to be momentarily opened by the lowermost pallet 26 of a tier of pallets 26 when they reach their position on the lifting fork 50. The circuit 174 controls a relay 176 which controls a circuit 177 including said motor 35 which operates the supply conveyor 30.

In Fig. 2 the top pallet 26 on the delivery conveyor 40 is shown supporting bricks 180 which were placed thereon by the block or brick making machine while this pallet was upon the pallet receiving member 18. The other bricks have been omitted from Fig. 8 merely for ease in illustrating the invention.

The operation of the device may be understood from the following:

Let us assume that the machine is in the condition as illustrated in Fig. 2 and let us assume that the pallet receiving member 18 just reached its lowered position so that the arm 99 which is mounted upon the bottom of the post 23, strikes the stem 98 of the valve 94 moving the valve head 96 down to the position illustrated in Fig. 12. This causes compressed air from the air line 100 to flow through the air pipes 101 to the back ends of the cylinders 90 forcing the pistons in these cylinders forwards and correspondingly moving the piston rods 91 which move the charging carriage 65 forwards. Because the bolts 80 engage the back end of the pallet 26 on the pallet receiving member 18 and because the pawls 87 engage the back of the top pallet 26 on the tier of pallets on the lifting fork 50, the pallet 26 on the pallet receiving member 18 will be moved forwards onto the lowering fork 51 and simultaneously the top pallet 26 of said tier of pallets will be moved upon the pallet receiving member 18. When the charging carriage 65 reaches its extreme position to the left, its charging position, the end 109 of the arm 108 strikes the top section 104 of the valve stem 98 pivoting the section 104 towards the left, in Fig. 15, and releasing the valve head 96 which is then moved upwards by the spring 97. The valve 94 now disconnects the air supply line 100 from the air lines 101 and connects the air lines 101 with the air discharge 103. The pistons in the cylinders 90 are now free to move back to their initial positions.

When the charging carriage 65 reached its charging position the finger 116 engaged the valve stem 112 of the valve 110 moving the valve head 96 thereof to the position illustrated in Fig. 13. The valve 110 now connects the compressed air supply line 100 with the air lines 114 supplying compressed air to the front ends of the cylinders 90 for moving the charging carriage 65 back to its starting position. While the charging carriage 65 is moving back to its starting position the bolts 89 will first strike the front end of the pallet 26 on the pallet receiving member 18 and because of the bevels 82, the bolts 80 will be depressed and will idle along the sides of the pallet 26 until they reach the back end of said pallet. Then the springs 81 extend the bolts 80 against the back edge of said pallet.

When the charging carriage 65 reaches its starting position the back end of the bar 68 will strike the lever of the switch 130 momentarily closing the switch. The circuit 131 is momentarily energized energizing the relay 132 and causing the contact arm 133 to engage the contact 135 which closes the circuit 136. This circuit 136 is a holding circuit that holds the contact arm 133 on the contact 135. The circuit 136 controls the relay 139 which closes the circuit 140 and energizes the electric motor 141 which now operates to drive the endless member 58. This causes the pallet lifting fork 50 to move upwards and the pallet lowering fork 51 to move downwards. This continues until the projection 138 strikes the lever of the uppermost switch 137. The switch 137 is momentarily opened breaking the holding circuit 136 and permitting the spring 134 to move the contact arm 133 off the contact 135. The relay 139 now becomes de-energized for opening the circuit 140 to stop the motor 141. The parts now remain in this condition until the pallet receiving member 18 performs one cycle of operation. This cycle consists in moving the pallet 26 upwards against the bottom of the mold 27 and then moving it back downwards to its initial position.

The block or brick machine takes care of moving the pallet receiving member 18. It also deposits the newly formed bricks or blocks upon the top of the pallet 26. When the pallet receiving member 18 again reaches its bottom position it again indirectly operates the valve 94 and the cycle of operation of the charging carriage 65 repeats. The operation keeps repeating so that the pallet lowering fork 51 moves downwards and the pallet lifting fork 50 progressively moves upwards. The pallet lifting fork 50 is supplying the charging member 65 with new pallets 26 while the pallet lowering fork 51 is restacking the pallets 26 with the bricks or blocks carried by them, back into tier formation.

When the pallet lowering fork 51 reaches its extreme bottom position, the projection 151 engages the lever of the switch 150 momentarily closing this switch. This closes the circuit through the holding relay 152 which closes the holding circuit 153 thereof. The circuit 153 controls the relay 155 which closes the circuit 157 which operates the motor 45 of the pallet delivery conveyor 40 which carries the tier of pallets 26 off from the pallet lowering fork 51. When the pallet delivery conveyor 40 moves a distance equal to the length of one of the pallets 26, one of the abutment strips 46 of the delivery conveyor 40 engages the levers of the switches 154 and 160 for simultaneously operating these switches. The switch 154 is a stop switch which opens the circuit to the holding relay 152 so that the circuit 153 and the circuit 157 open. The motor 45 now stops functioning.

The switch 160 is momentarily closed by the abutment strip 46 and energizes the holding relay 162 which closes the circuit 163. The circuit 163 operates the relay 139 for closing the circuit 140 for operating the electric motor 141. The circuit 163 also contains an electromagnet 167 which throws the reversing switch 168 so that the motor 141 is now operating in reverse. The endless member 58 now moves to raise the lowering fork 51 and to lower the lifting fork 50. This continues until the lifting fork 50 reaches its bottommost position at which time the arms 165 engage the levers of the switches 164 and 170. The switch 164 is a stop switch for the holding relay 162 causing the relay to function to open the circuit 163 so that the reversing switch 168 is returned by the spring 169, to its forward position. The relay 139 operates to open the circuit 140 to stop operation of the motor 141.

The switch 170 is a start switch which when closed energizes the holding relay 172 causing the relay to close the circuit 174 for operating the relay 176 which closes the circuit 177 and causes the motor 35 to function. The motor 35 drives the pallet supply conveyor 30 which now moves an entire tier of new pallets 26 forwards to a position upon the pallet lifting fork 50. The top pallet 26 thereof rides under the pawls 87. The pawls 87 swing up permitting the top pallet 26 to pass and after the pallet 26 reaches its position, the pawls 87 will drop down in back of the top pallet 26 and the feeding operation of the charging carriage 65 is now ready to continue. When the tier of pallets 26 reach this position on the lifting fork 50, the bottommost pallet 26 engages the lever of the switch 175 operating the switch to open the circuit 174. The relay 172 now keeps the circuit 174 open. The relay 176 functions to open the circuit 177 which stops the motor 35. The cycle of operation now repeats.

While I have illustrated and described the preferred embodiment of my invention, it is to be understood that I do not limit myself to the precise constructions herein disclosed and the right is reserved to all changes and modifications coming within the scope of the invention as defined in the appended claims.

Having thus described my invention, what I claim as new and desire to secure by United States Letters Patent is:

1. In a pallet charging and tiering machine, a pallet supply conveyor, a pallet lifting fork for receiving a tier of pallets from said conveyor when in a bottom position, means for raising said fork periodically in steps one pallet height until it reaches its top position, means for returning said fork to its bottom position and means controlled by said fork in its bottom position for operating said supply conveyor for supplying said pallet lifting fork with a new tier of pallets.

2. In a pallet charging and tiering machine, a pallet supply conveyor, a pallet lifting fork for receiving a tier of pallets from said conveyor when in a bottom position, means for raising said fork periodically in steps one pallet height until it reaches its top position, means for returning said fork to its bottom position and means controlled by said fork in its bottom position for operating said supply conveyor for supplying said pallet lifting fork with a new tier of pallets, said means for raising said fork including a drive motor, a start switch and a series of stop switches means for periodically operating said start switch, and means connected with said lifting fork for operating said stop switches in certain positions of said lifting fork.

3. In a pallet charging and tiering machine, a pallet supply conveyor, a pallet lifting fork for receiving a tier of pallets from said conveyor when in a bottom position, means for raising said fork periodically in steps one pallet height until it reaches its top position, means for returning said fork to its bottom position and means controlled by said fork in its bottom position for operating said supply conveyor for supplying said pallet lifting fork with a new tier of pallets, said means for returning said fork to its bottom position including a drive motor, and start and stop switches controlling said drive motor.

4. In a pallet charging and tiering machine, a frame, a pallet lifting fork vertically slidably mounted on said frame, a pallet lowering fork vertically slidably mounted on said frame, a movable endless member having opposite sides connected with said forks, means for guiding said endless member, whereby said forks are moved in opposite directions when said endless member is moved, means for periodically moving said endless member a predetermined distance in order to periodically raise said lifting fork and lower said lowering fork in steps of a height equal to the height of each of the pallets of a tier of pallets to be handled by said machine, means for periodically moving said endless member after said lifting fork has reached its top position and said lowering fork has reached its bottom position in order to move said lifting fork to its top position, means controlled by and when said lifting fork reaches its bottom position for supplying said lifting fork with a tier of pallets, means for transferring the tier of pallets from said lifting fork to said lowering fork at the rate of one pallet at a time for and upon each step of upward motion of said lifting fork, and means controlled by and when said lowering fork reaches its bottom position for removing a tier of pallets from said lowering fork.

5. A pallet charging, loading and tiering machine, comprising a frame, a pallet receiving member vertically movably mounted on said frame for periodic vertical reciprocation by a block or brick machine from a lowered pallet receiving position to a raised position to receive their charges of blocks or bricks and back to said lowered position, a pallet supply conveyor for supplying a tier of pallets to one side of said member, a pallet delivery conveyor for carrying away a tier of pallets from the other side of said member, a pallet lifting fork for receiving a tier of pallets from said supply conveyor for supplying said member, a pallet lowering fork for receiving pallets from said member in tier formation for supplying said delivery conveyor, a charging carriage for moving the top pallet from said lifting fork to a position on said member and for moving a pallet from said member to a position on said lowering fork or upon pallets already on said lowering fork, means for moving said carriage to a charging position when said member reaches a pallet receiving position and then back to a starting position, means for lowering said lowering fork and raising said lifting fork one pallet height each time said charging carriage performs one cycle of its movements, means for operating said delivery conveyor each time said lowering fork supplies it with a tier of pallets for removing them from said lowering fork, means for returning said lowering fork to a raised position and returning said lifting fork to its lowered position each time a tier of pallets is removed from said lowering fork, and means for operating said supply conveyor each time said lifting fork reaches its lowered position for supplying it with a new tier of pallets.

6. A pallet charging, loading and tiering machine, comprising a frame, a pallet receiving member vertically movably mounted on said frame for periodic vertical reciprocation by a block or brick machine from a lowered pallet receiving position to a raised position to receive their charges of blocks or bricks and back to said lowered position, a pallet supply conveyor for supplying a tier of pallets to one side of said member, a pallet delivery conveyor for carrying away a tier of pallets from the other side of said member, a pallet lifting fork for receiving a tier of pallets from said supply conveyor for supplying said member, a pallet lowering fork for receiving pallets from said member in tier formation for supplying said delivery conveyor, a charging carriage for moving the top pallet from said lifting fork to a position on said member and for moving a pallet from said member to a position on said lowering fork or upon pallets already on said lowering fork, means for moving said carriage to a charging position when said member reaches a pallet receiving position and then back to a starting position, means for lowering said lowering fork and raising said lifting fork one pallet height each time said charging carriage performs one cycle of its movements, means for operating said delivery conveyor each time said lowering fork supplies it with a tier of pallets for removing them from said lowering fork, means for returning said lowering fork to a raised position and returning said lifting fork to its lowered position each time a tier of pallets are removed from said lowering fork, and means for operating said supply conveyor each time said lifting fork reaches its lowered position for supplying it with a new tier of pallets, said means for moving said carriage including an air cylinder and piston with a piston rod connected with said carriage, an air valve for controlling forward motion of said carriage, and an air valve for controlling motion of said carriage back to its starting position.

7. A pallet charging, loading and tiering machine, comprising a frame, a pallet receiving member vertically movably mounted on said frame for periodic vertical reciprocation by a block or brick machine from a lowered pallet receiving position to a raised position to receive their charges of blocks or bricks and back to said lowered position, a pallet supply conveyor for supplying a tier of pallets to one side of said member, a pallet delivery conveyor for carrying away a tier of pallets from the other side of said member, a pallet lifting fork for receiving a tier of pallets from said supply conveyor for supplying said member, a pallet lowering fork for receiving pallets from said member in tier formation for supplying said delivery conveyor, a charging carriage for moving the top pallet from said lifting fork to a position on said member and for moving a pallet from said member to a position on said lowering fork or upon pallets already on said lowering fork, means for moving said carriage to a charging position when said member reaches a pallet receiving position and then back to a starting position, means for lowering said lowering fork and raising said lifting fork one pallet height each time said charging carriage performs one cycle of its movements, means for operating said delivery conveyor each time said lowering fork supplies it with a tier of pallets for removing them from said lowering fork, means for returning said lowering fork to a raised position and returning said lifting fork to its lowered position each time a tier of pallets are removed from said lowering fork, and means for operating said supply conveyor each time said lifting fork reaches its lowered position for supplying it with a new tier of pallets, said means for lowering said lowering fork and raising said lifting fork including a start switch, a motor controlled by said start switch for moving said forks, and a stop switch for each pallet of said tier of pallets.

8. A pallet charging, loading and tiering machine, comprising a frame, a pallet receiving member vertically movably mounted on said frame for periodic vertical reciprocation by a block or brick machine from a lowered pallet receiving position to a raised position to receive their charges of blocks or bricks and back to said lowered position, a pallet supply conveyor for supplying a tier of pallets to one side of said member, a pallet delivery conveyor for carrying away a tier of pallets from the other side of said member, a pallet lifting fork for receiving a tier of pallets from said supply conveyor for supplying said member, a pallet lowering fork for receiving pallets from said member in tier formation, for supplying said delivery conveyor, a charging carriage for moving the top pallet from said lifting fork to a position on said member and for moving a pallet from said member to a position on said lowering fork or upon pallets already on said lowering fork, means for moving said carriage to a charging position when said member reaches a pallet receiving position and then back to a starting position, means for lowering said lowering fork and raising said lifting fork one pallet height each time said charging carriage performs one cycle of its movements, means for operating said delivery conveyor each time said lowering fork supplies it with a tier of pallets for removing them from said lowering fork, means for returning said lowering fork to a raised position and returning said lifting fork to its lowered position each time a tier of pallets are removed from said lowering fork, and means for operating said supply conveyor each time said lifting fork reaches its lowered position for supplying it with a new tier of pallets, said means for operating said delivery conveyor including a start switch, a drive motor for said delivery conveyor controlled with said start switch, and a stop switch operated by said delivery conveyor when it has moved a distance equal to the length of one of said pallets.

9. A pallet charging, loading and tiering machine, comprising a frame, a pallet receiving member vertically movably mounted on said frame for periodic vertical reciprocation by a block or brick machine from a lowered pallet receiving position to a raised position to receive their charges of blocks or bricks and back to said lowered position, a pallet supply conveyor for supplying a tier of pallets to one side of said member, a pallet delivery conveyor for carrying away a tier of pallets from the other side of said member, a pallet lifting fork for receiving a tier of pallets from said supply conveyor for supplying said member, a pallet lowering fork for receiving pallets from said member in tier formation for supplying said delivery conveyor, a charging carriage for moving the top pallet from said lifting fork to a position on said member and for moving a pallet from said member to a position on said lowering fork or upon pallets already on said lowering fork, means for moving said carriage to a charging position when said member reaches a pallet receiving position and then back to a starting position, means for lowering said lowering fork and raising said lifting fork one pallet height each time said charging carriage performs one cycle of its movements, means for operating said delivery conveyor each time said lowering fork supplies it with a tier of pallets for removing them from said lowering fork, means for returning said lowering fork to a raised position and returning said lifting fork to its lowered position each time a tier of pallets are removed from said lowering fork, and means for operating said supply conveyor each time said lifting fork reaches its lowered position for supplying it with a new tier of pallets, said means for returning said lowering fork to a raised position and said lifting fork to its lowered position including a start switch, a reversible motor for moving said forks controlled by said start switch, and a stop switch for said motor operated by one of said forks when it reaches this starting position.

10. A pallet charging, loading and tiering machine, comprising a frame, a pallet receiving member vertically movably mounted on said frame for periodic vertical reciprocation by a block or brick machine from a lowered pallet receiving position to a raised position to receive their charges of blocks or bricks and back to said lowered position, a pallet supply conveyor for supplying a tier of pallets to one side of said member, a pallet delivery conveyor for carrying away a tier of pallets from the other side of said member, a pallet lifting fork for receiving a tier of pallets from said supply conveyor for supplying said member, a pallet lowering fork for receiving pallets from said member in tier formation for supplying said delivery conveyor, a charging carriage for moving the top pallet from said lifting fork to a position on said member and for moving a pallet from said member to a position on said lowering fork or upon pallets already on said lowering fork, means for moving said carriage to a charging position when said member reaches a pallet receiving position, and then back to a starting position, means for lowering said lowering fork and raising said lifting fork one pallet height each time said charging carriage performs one cycle of its movements, means for operating said delivery conveyor each time said lowering fork supplies it with a tier of pallets for removing them from said lowering fork, means for returning said lowering fork to a raised position and returning said lifting fork to its lowered position each time a tier of pallets are removed from said lowering fork, and means for operating said supply conveyor each time said lifting fork reaches its lowered position for supplying it with a new tier of pallets, comprising a start switch, a motor for driving said supply conveyor operated by said start switch, and a stop switch for said motor operated by pallets on said conveyor when they reach their starting position.

11. A pallet loading device, comprising a frame, a pallet receiving member vertically movably mounted on said frame for periodic vertical reciprocation by a block or brick machine from a lowered pallet receiving position to a raised position to receive their charges of blocks or bricks and back to said lowered position, a pallet up-lift to one side of said member for receiving a tier of pallets for supplying said member, a pallet down-lift to the other side of said member for receiving pallets from said member in tier formation, a charging carriage for moving the top pallet from said up-lift to a position on said member and for moving a pallet from said member to a position on said down-lift or upon pallets already on said down-lift, means controlled by said member for moving said carriage to a charging position when said member reaches a pallet receiving position and then back to a starting position, and means controlled by said charging carriage for lowering said down-lift and raising said up-lift one pallet height each time said charging carriage performs one cycle of its movement.

12. A pallet loading device, comprising a frame, a pallet receiving member vertically movably mounted on said frame for periodic vertical reciprocation by a block or brick machine from a lowered pallet receiving position to a raised position to receive their charges of blocks or bricks and back to said lowered position, a pallet up-lift to one side of said member for receiving a tier of pallets for supplying said member, a pallet down-lift to the other side of said member for receiving pallets from said member in tier formation, a charging carriage for moving the top pallet from said up-lift to a position on said member and for moving a pallet from said member to a position on said down-lift or upon pallets already on said down-lift, means controlled by said member for moving said carriage to a charging position when said member reaches a pallet receiving position and then back to a starting position, and means controlled by said charging carriage for lowering said down-lift and raising said up-lift one pallet height each time said charging carriage performs one cycle of its movement, said means for moving said carriage including an air cylinder and piston with a piston rod connected with said carriage, an air valve for controlling forward motion of said carriage, and an air valve for controlling motion of said carriage back to its starting position.

13. A pallet loading device, comprising a frame, a pallet receiving member vertically movably mounted on said frame for periodic vertical reciprocation by a block or brick machine from a lowered pallet receiving position to a raised position to receive their charges of blocks or bricks and back to said lowered position, a pallet up-lift to one side of said member for receiving a tier of pallets for supplying said member, a pallet down-lift to the other side of said member for receiving pallets from said member in tier formation, a charging carriage for moving the top pallet from said up-lift to a position on said member and for moving a pallet from said member to a position on said down-lift or upon pallets already on said down-lift, means controlled by said member for moving said carriage to a charging position when said member reaches a pallet receiving position and then back to a starting position, and means controlled by said charging carriage for lowering said down-lift and raising said up-lift one pallet height each time said charging carriage performs one cycle of its movement, said means for lowering said down-lift and raising said up-lift including a start switch, a motor controlled by said start switch for moving said lifts, and a stop switch for each pallet of said tier of pallets.

14. A pallet loading device, comprising a frame, a pallet receiving member vertically movably mounted on said frame for periodic vertical reciprocation by a block or brick machine from a lowered pallet receiving position to a raised position to receive their charges of blocks or bricks and back to said lowered position, a pallet up-lift to one side of said member for receiving a tier of pallets for supplying said member, a pallet down-lift to the other side of said member for receiving pallets from said member in tier formation, a charging carriage for moving the top pallet from said up-lift to a position on said member and for moving a pallet from said member to a position on said down-lift or upon pallets already on said down-lift, means controlled by said member for moving said carriage to a charging position when said member reaches a pallet receiving position and then back to a starting position, and means controlled by said charging carriage for lowering said down-lift and raising said up-lift one pallet height each time said charging carriage performs one cycle of its movement, a pallet supply conveyor for supplying a tier of pallets to said up-lift, a pallet delivery conveyor for carrying away a tier of pallets from said down-lift, means for operating said delivery conveyor each time said down-lift supplies it with a tier of pallets for removing them from said down-lift, means for returning said down-lift to its raised position and returning said up-lift to its lowered position each time a tier of pallets are removed from said down-lift, and means for operating said supply conveyor each time said up-lift reaches its lowered position for supplying it with a new tier of pallets.

LOUIS GELBMAN.

REFERENCES CITED

The following references are of record in the file of this patent:

UNITED STATES PATENTS

| Number | Name | Date |
|---|---|---|
| 279,528 | Blair | June 19, 1883 |
| 857,364 | Rosback | June 18, 1907 |
| 976,243 | Zagelmeyer | Nov. 22, 1910 |
| 1,350,393 | Tzibides et al. | Aug. 24, 1920 |
| 1,639,576 | Semashko | Aug. 16, 1927 |
| 1,646,067 | Roberts | Oct. 18, 1927 |
| 1,674,620 | Eberling | June 19, 1928 |
| 1,913,533 | Brunner | June 13, 1933 |
| 2,065,674 | Fay, Jr. | Dec. 29, 1936 |
| 2,200,708 | Towne et al. | May 14, 1940 |
| 2,344,923 | Robinson | Mar. 21, 1944 |
| 2,362,853 | Spiller et al. | Nov. 14, 1944 |
| 2,372,229 | Sinkovitz | Mar. 27, 1945 |
| 2,396,090 | Curtis | Mar. 5, 1946 |
| 2,397,720 | Beane | Apr. 2, 1946 |